United States Patent [19]

Flax

[11] Patent Number: 4,475,395

[45] Date of Patent: Oct. 9, 1984

[54] METHOD FOR RECOGNIZING DIFFERENT FREQUENCY DEPENDENT SCATTER MECHANISMS IN NON-HOMOGENEOUS TISSUES

[75] Inventor: Stephen W. Flax, Waukesha, Wis.

[73] Assignee: General Electric Company, Rancho Cordova, N.Y.

[21] Appl. No.: 398,816

[22] Filed: Jul. 16, 1982

[51] Int. Cl.³ .............................................. G01N 29/04
[52] U.S. Cl. ..................................................... 73/599
[58] Field of Search ............. 73/1 DV, 631, 599, 627, 73/620, 602, 618; 128/660

[56] References Cited

U.S. PATENT DOCUMENTS 3,309,914  3/1967  Weighart ............................. 73/631
4,016,750  4/1977  Green .................................. 73/631

OTHER PUBLICATIONS

"Ultrasonic Attenuation Tomography of Soft Tissues"; Dines et al, *Ultrasonic Imaging,* vol. 1, No. 1, 1979.
"Estimating the Acoustic Attenuation Coefficient Scope for Liver from Reflected Ultrasound Signals", Kuc et al, IEEE Transactions on Sonics and Ultrasonics, vol. SU-26, No. 5, Sep. 1979.

*Primary Examiner*—Anthony V. Ciarlante
*Attorney, Agent, or Firm*—Flehr, Hohbach, Test, Albritton & Herbert

[57] ABSTRACT

Time gain control of a variable gain amplifier in an ultrasonic scanning system is defined from ultrasonic attenuation of tissue under examination. An ultrasonic signal is directed into the tissue and a reflected signal is detected. The frequency of the reflected signal is measured, and frequency dependent scatter perturbations are identified and eliminated from the measured frequency. Tissue attenuation is then established from the measured frequency after perturbations are eliminated.

4 Claims, 3 Drawing Figures

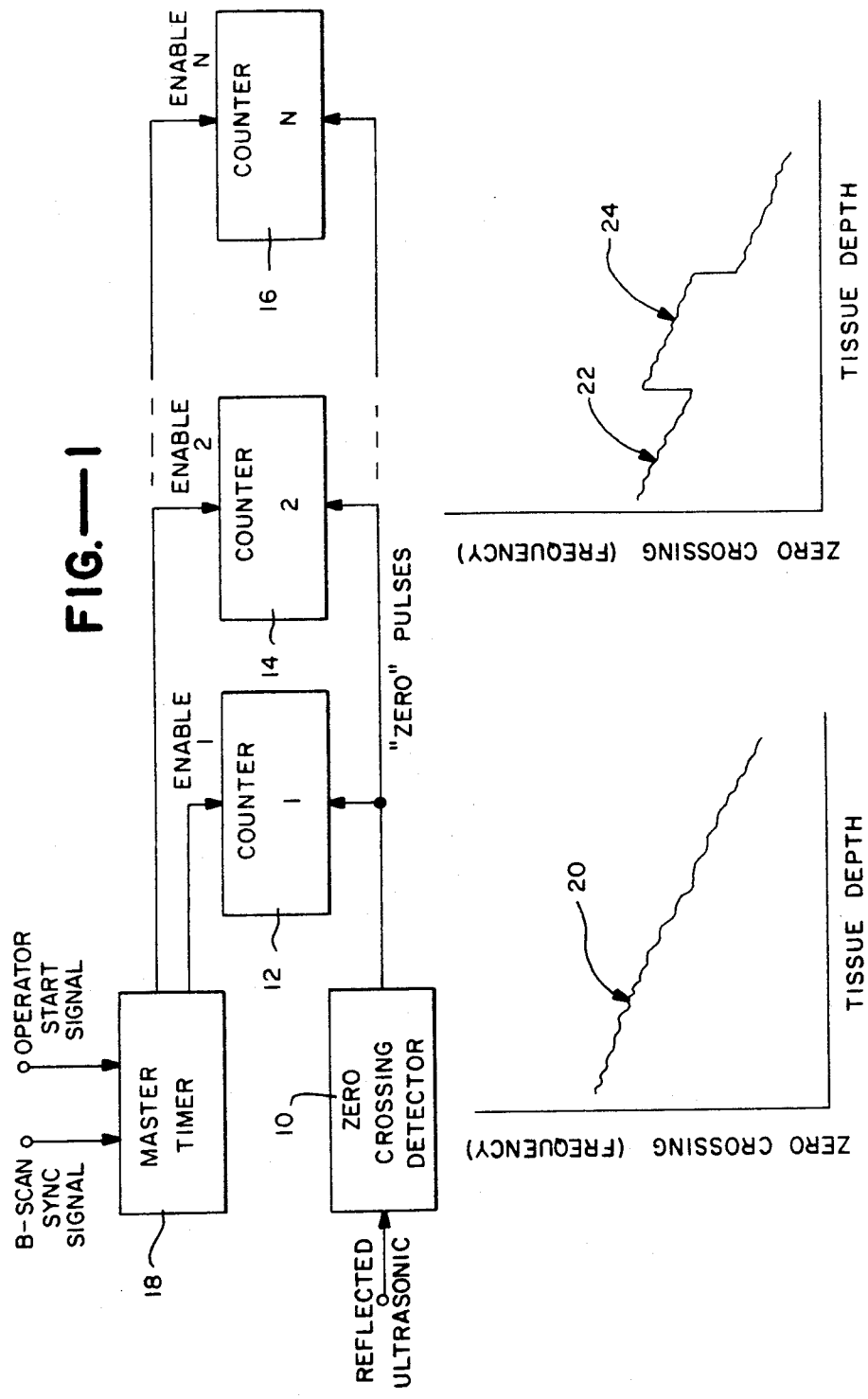

METHOD FOR RECOGNIZING DIFFERENT FREQUENCY DEPENDENT SCATTER MECHANISMS IN NON-HOMOGENEOUS TISSUES

This invention relates generally to ultrasonic scanning as used for medical diagnostic purposes, and more particularly the invention relates to a method of characterizing the frequency dependent scatter properties of biological tissues.

Ultrasonic diagnostic systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive reflected signals. The echo signals are applied to a time gain compensated amplifier to adjust the echo signals for attenuation in passing through the patient. The adjusted signals are then passed through an analog to digital conversion and video processing circuitry and thence to scan converter circuitry for display format.

Disclosed in co-pending patent application Ser. No. 369,423 filed Apr. 19, 1982, now U.S. Pat. No. 4,441,368, for "METHOD AND MEANS FOR DETERMINING ULTRASONIC WAVE ATTENUATION IN TISSUE", is a method of determining frequency dependent attenuation at differing levels in tissue using a time domain analysis rather than a frequency domain analysis.

More particularly, by counting the zero crossings of a reflected ultrasonic signal for different levels in tissue under examination and then comparing the zero crossing density at one level to the zero crossing density at a second level, the attenuation of the tissue between the two levels can be ascertained. The method and apparatus for determining zero crossing density is relatively simple and reliable.

As more particularly described in the application, the theoretical relationship of the attenuation coefficient of tissue to the zero crossing density of the returned ultrasonic signal is based on the theoretical relationships described by S. O. Rice in "Mathematical Analysis of Random Noise", Bell System Technical Journal 23, 24, Pages 1-162, 1944 and 1945 and Dines and Kak, "Ultrasonic Attenuation Tomography of Soft Tissues", *Ultrasonic Imaging*, Vol. 1, No. 1, Pages 16-33, 1979. According to the Dines and Kak paper if the spectrum of an ultrasonic pulse is Gaussian in shape then frequency selective attenuation will merely produce a downward translation of the spectrum with depth, leaving the spectral shape unchanged. This is shown in FIG. 4 as follows. Assuming a signal power spectrum of $$x(f) = a_o e^{-(f-f_0)^2/2\sigma^2}$$

and an attenuation term $$a(f) = e^{-\alpha_o f l}$$

where $a_o$ is an amplitude constant, $f$ = frequency, $f_o$ = center frequency of the spectrum, $\alpha_o$ the relative attenuation, and $l$ = the propagation path length. It should be noted that equation 2 makes the assumption the attenuation is linearly related to frequency. While this is true for tissue, the invention is not limited to linear dependence of frequency on attenuation. The resulting signal spectrum is the product of (1) and (2). Hence, $$S(f) = (f) \cdot x(f)$$
$$= a_o e^{-\alpha_o f l} e^{-(f-f_0)^2/2\sigma^2}$$
$$= a_o e^{-[f^2 - 2ff_0 + 2\alpha_o\sigma^2 fl + f_0^2]/2\sigma^2}$$

The center of this spectrum can be found by finding the minimum of the term being exponentiated. Therefore, taking the derivative with respect to f and setting it equal to 0, one obtains $$d[f^2 - 2ff_0 + 2\sigma^2\alpha_o fl + f_0^2] = 2f - 2f_0 + 2\alpha^2\alpha_o fl = 0$$

or $$f_{peak} = f_0 - (\sigma^2 \alpha_o l)$$

it is seen that the peak of the Gaussian spectrum simply slides linearly toward lower frequencies as a function of $\alpha_o$ and $l$. Since the spectral shape is constant, a good estimate of $\alpha_o$ can be obtained simply by finding the center of the Gaussian shape, as follows:

$$\alpha_o = -\frac{1}{\sigma^2} \frac{\Delta f_c}{\Delta l}$$

Thus, by obtaining the change in frequency (or change in zero crossing) along a known propagation path (i.e. between two levels), the attenuation coefficient, $\alpha_o$, is obtained as a function of the transducer bandwidth parameter, $\sigma$.

However, it has now been observed that a simple monotonically decreasing shift in frequency as predicted by attenuation alone does not always occur. A significant variation in frequency shift can be noted due to a preferential frequency effect. If this shift in frequency is detected adequately, then the shift itself may be used to characterize the interrogated tissue. In addition, these perturbations can bias the tissue attenuation derived from analysis of the frequency shift of the reflected waves.

Accordingly, an object of the present invention is an improved method of detecting and determining variations in frequency dependent scatter properties of biologic tissues based on a frequency shift of reflected ultrasonic signals.

A feature of the invention is the use of a frequency dependent factor for characterizing the scattering of energy preferentially at different frequencies.

The invention and objects and features thereof will be more readily apparent from the following detailed description and appended claims when taken with the drawing, in which:

FIG. 1 is a functional block diagram of apparatus useful in establishing ultrasonic attenuation in tissue under analysis.

FIG. 2 is a plot of frequency versus tissue depth based on assumed monotonically decreasing frequency shift.

FIG. 3 is a plot of frequency versus tissue depth including a region of increased frequency due to a change in scatter properties of the tissue in that region.

Referring now to the drawings, FIG. 1 is a functional block diagram of apparatus as disclosed in copending application Ser. No. 369,423, now U.S. Pat. No. 4,441,368, supra, in which a reflected ultrasonic signal from tissue under examination is applied to a zero crossing detector 10. The detector 10 preferably comprises a monostable multivibrator which is triggered by a Schmitt trigger whereby a pulse is generated in response to each zero crossing of the reflected signal. Such a Schmitt trigger and monostable multivibrator is commercially available, for example the Texas Instruments 74221 integrated circuit device. The output of the detector 10 is a series of pulses which are then connected to a plurality of counters such as counter 1, counter 2, . . . counter N. In a preferred embodiment each counter is a conventional pulse counter. Alternatively, each counter can comprise capacitive means for storing charge in response to the pulses.

A master timer 18 controls each of the counters whereby a count is accumulated for a specific interval of time corresponding to a depth in the tissue under examination. The master timer receives an operator start signal and a sync signal from the ultrasonic scanner, and enable signals are then generated for each of the counters based on the time of flight of an ultrasonic wave in the tissue under examination and the depth of the tissue from which zero crossings for reflected signals are to be counted.

By comparing the count at one level to the count at another level the frequency dependent attenuation of an acoustic wave therebetween is established based on the equation given above and as described in copending application Ser. No. 369,423. By so establishing the attenuation throughout the tissue under examination a more accurate means of quantifying tissue attenuation is thus achieved.

FIG. 2 is a plot of zero crossings (e.g. frequency) versus tissue depth as may be expected assuming a monotonically decreasing frequency shift. The longer the reflection path length of an ultrasonic wave the lower will be the zero crossing count or frequency of the detected wave. The use of zero crossing density to derive an attenuation value produces an estimate thereof since any single measure of zero crossing density for a finite sample interval will necessarily have a variance associated therewith. Normally, the variance of a sample can be reduced by increasing the sample interval such as described by Flax et al in "Statistical Evaluation of the Doppler Ultrasonic Blood Flow Meter", ISA Transactions, Vol. 10, No. 1.

FIG. 3 is a plot of zero crossings or frequency versus depth as is sometimes observed. It is noted that in the intermediate region 24 of the curve 22 the zero crossings and frequency takes an abrupt increase. Such an increase is not readily comprehended based on the assumption that a monotonically decreasing shift in frequency should occur in the tissue. It is known, however that a significant variation in frequency shift results from scatter perturbations or a preferential frequency effect rather than to a change in attentuation.

In accordance with this principle a frequency dependent term is multiplied by the scatter equation such that the scatterers reradiate energy preferentially at different frequencies. This is well known phenomenon and is expressed as a term ($f^z$) where f is frequency and z is a coefficient ranging from zero (for specular reflectors) to four (for Rayleigh scatter). Thus the scatter equation becomes $$|y(f)|^2 = (f^z)(e^{-a_0 l f})(e^{-(f-f_0)^2/2\sigma^2})|A(f)|^2 \qquad (1)$$

where ($e^{-a_0 l f}$) is the attenuation term, $e^{-(f-f_0)^2/2\sigma^2}$ is the spectral envelope of the transducer, and $|A(f)|^2$ is the random scatter variable depicting noise modulation. The exponential terms can be combined and the square completed to determine how the spectrum changes as a function of l. A similar procedure is performed for the $f^z$ term. Accordingly, the following approximation using a three term Taylor expansion is derived:

$$f^z = e^{ln(f^z)} = e^{z\,ln(f)} \approx e^{z[ln(f_0) + (f-f_0)/f_0 - (f-f_0)^2/2f_0^2]} \qquad (2)$$

This term can be taken inside the expansion as follows:

$$|y(f)|^2 = |A(f)|^2 e^{-[((f^2 - 2ff_0 + f_0^2)/2\sigma^2) - [a_0 l f] + [z\,ln(f_0) + z(f-f_0)/f_0 - z(f-f_0)^2/2f_0^2]]} \qquad (3)$$

By differentiating the exponential as a function of f and setting the differential equal to zero, the maximum amplitude or center frequency is determined. Thus, solving for the center frequency yields $$f_{center} = \left[\frac{f_0^2}{f_0^2 - z\sigma^2}\right] [f_0 + (2z\sigma^2/f_0) - a_0\sigma^2 l] \qquad (4)$$

Without the ($f^z$) term one would expect to find $$f_{center} = (f_0 - a_0\sigma^2 l) \qquad (5)$$

Thus, if $z\sigma$ is small compared to $f_0$, a change of z, from 1 to 2, for example, does not change the term $[f_0^2/(f_0^2 - z\sigma^2)]$ very much.

However, the term ($2z\sigma^2/f_0$) can produce a sizeable change in frequency.

The ($-a_0\sigma^2 l$) term always produces a monotonically decreasing center frequency (with random perturbations added to the otherwise linear function). If, however, a region of tissue is traversed which has an elevated z value, then there will be corresponding actual frequency shift upwards. This is the effect illustrated in FIG. 3. By averaging many scans between the two adjacent scatter regions it is possible to ascertain whether or not the change is real or a statistical aberration. Determining these shifts is then a valid way of characterizing differences in tissue using diagnostic ultrasound techniques.

By introducing the frequency dependent scatter factor, $f^z$, in the determination of the frequency of reflected signals, as described, a means of characterizing the frequency dependence of scatter is obtained. Accordingly, this frequency dependent scatter factor may be used to characterize the tissue being investigated. In addition, correcting for this factor will result in a more accurate attenuation measurement.

While the invention has been described with reference to a specific embodiment the description is illustrative of the invention and is not to be construed as limiting the invention. Various modifications and applications may occur to those skilled in the art without departing from the true spirit and scope of the invention as defined by the appended claims.

What is claimed is:

1. A method of determining the frequency dependence of scatter within a biologic tissue comprising the steps of transmitting a plurality of ultrasonic waves into said tissue, receiving reflected ultrasonic waves from the tissue, detecting the frequencies of said reflected ultrasonic waves from various depths in said tissue, detecting shifts in said frequencies that are larger than can be accounted for via statistical variations and attenuation alone, and determining the frequency dependence of scatter based on said shift.

2. A method of determining attenuation of tissue to ultrasonic energy comprising the steps of directing an ultrasonic signal into said tissue, detecting reflected ultrasonic signals, identifying frequency dependent scatter perturbations in said reflected ultrasonic energy, characterizing said perturbation from said detected signals, and determining tissue attenuation from said detected signals after correcting for said perturbations.

3. The method as defined by claim 2 wherein said step of detecting reflected ultrasonic signals includes determining the frequency of said reflected ultrasonic signals.

4. The method as defined by claim 3 wherein said step of determining the frequency of said reflected ultrasonic signals includes determining the zero crossings of said reflected ultrasonic signals.

* * * * *

UNITED STATES PATENT AND TRADEMARK OFFICE
CERTIFICATE OF CORRECTION

PATENT NO. : 4,475,395
DATED : October 9, 1984
INVENTOR(S) : Stephen W. Flax

It is certified that error appears in the above—identified patent and that said Letters Patent is hereby corrected as shown below:

Col. 1, lines 62-67 should read as follows:

$$x(f) = a_o e^{-(f-f_o)^2/2\sigma^2}$$

and an attenuation term $$\alpha(f) = e^{-\alpha_o f \ell}$$

where $a_o$ is an amplitude constant, f=frequency, $f_o$= center

Col. 2, line 19, the equation should read:

$$d[f^2 - 2ff_o + 2\sigma^2 \alpha_o f\ell + f_o^2] = 2f - 2f_o + 2\sigma^2 \alpha_o f\ell = 0$$

Col. 4, line 2, the second equation should read as follows:

$$e^{-(f-f_o)^2/2\sigma^2}$$

Signed and Sealed this

Twenty-eighth Day of May 1985

[SEAL]

Attest:

DONALD J. QUIGG

*Attesting Officer*    *Acting Commissioner of Patents and Trademarks*